June 20, 1967  R. L. ABOS  3,326,377
BRINE METERING FLOAT VALVE
Filed Jan. 31, 1963  3 Sheets-Sheet 1
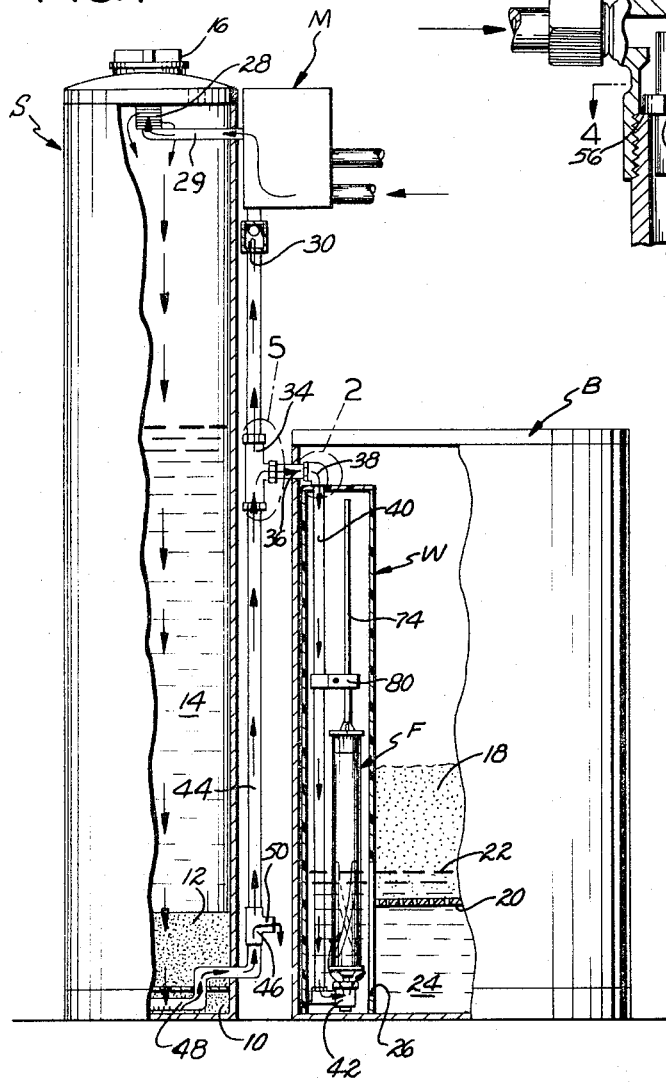
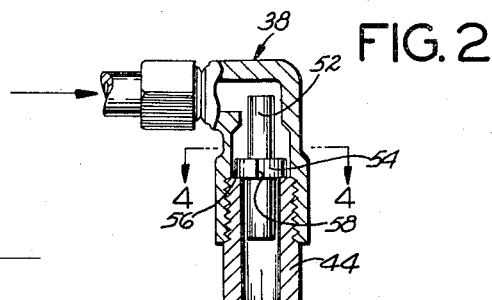
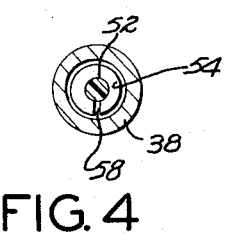
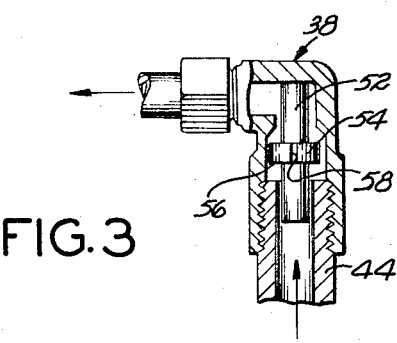
RALPH L. ABOS
INVENTOR.
BY  *Boniard I. Brown*
ATTORNEY June 20, 1967 R. L. ABOS 3,326,377
BRINE METERING FLOAT VALVE
Filed Jan. 31, 1963 3 Sheets-Sheet 2

RALPH L. ABOS
INVENTOR.

BY
*Boniard I. Brown*
ATTORNEY

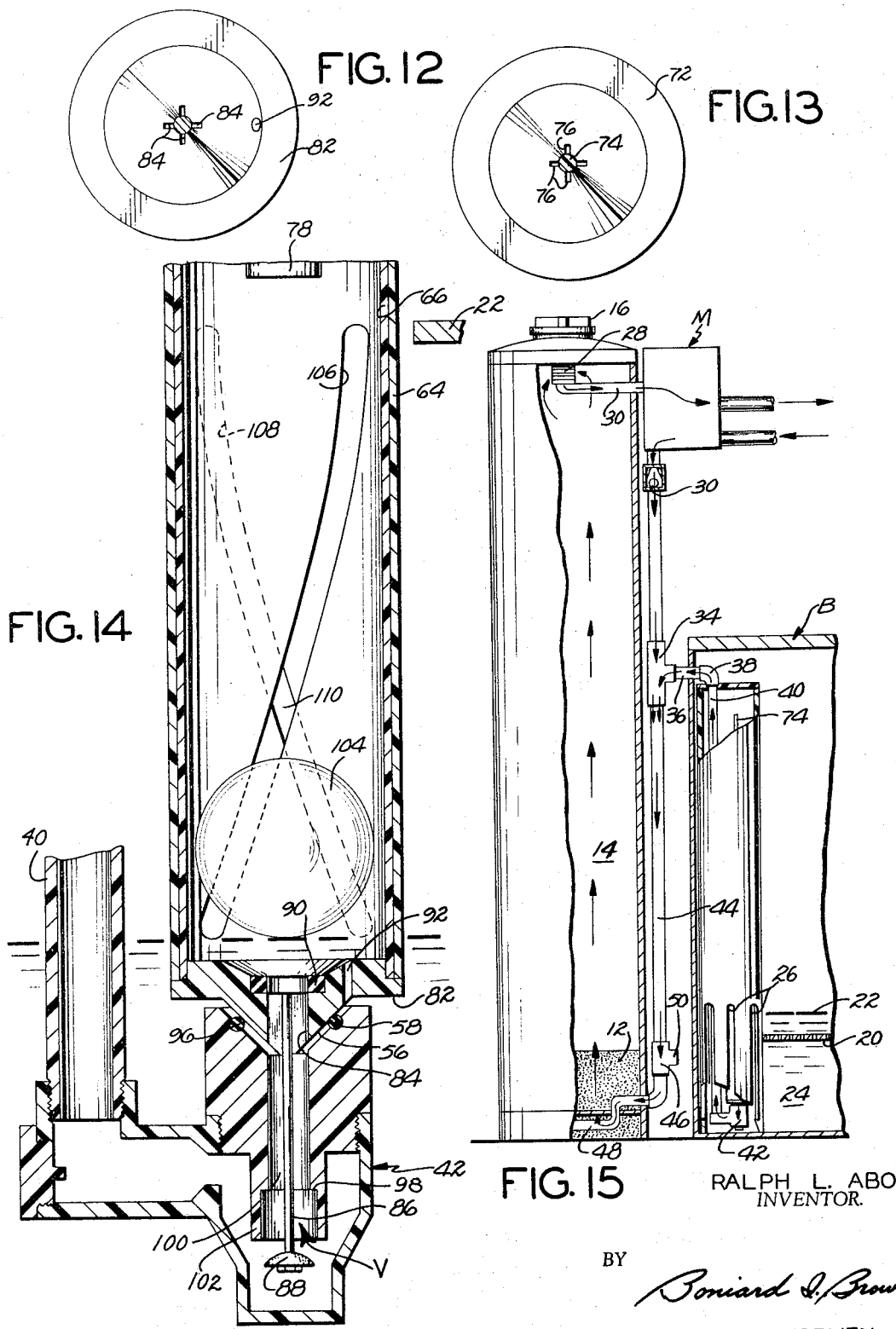

United States Patent Office 3,326,377
Patented June 20, 1967

3,326,377
BRINE METERING FLOAT VALVE
Ralph L. Abos, 10144 Grovedale Drive,
Whittier, Calif.
Filed Jan. 31, 1963, Ser. No. 255,372
4 Claims. (Cl. 210—126)

The present invention relates generally to means for regulating the quantity of liquid supplied from a tank; more particularly, the invention relates to adjustable brine metering valve means for controlling the quantity of brine utilized in the regeneration cycle of water softening equipment.

The brine metering valve apparatus of the present invention is adapted for utilization with equipment of the general category of that disclosed and claimed in U.S. Patent No. 2,907,462 to Francis H. Webb. This patent relates to water softening apparatus embodying a brine tank, a softener tank containing an exchanger bed for softening water flowing therethrough, and means for rejuvenating the exchanger bed intermittently by passing brine and rinse water in a reverse direction through the softener tank. A substantially continuous supply of softened water is provided, the intermittent rejuvenation of the exchanger bed renewing its ability to soften water. The operating cycles of the systems are controlled by appropriate mechanisms. Flow of hard water to the softening tank is permitted during the softening cycle, and the mechanisms reverse the flow of hard water during the rejuvenating or regenerating cycle, as by opening a drain port and controlling the flow of rinse water to the softener tank. Time-controlled valves or special master control valve mechanisms are widely used for governing the length of the regeneration cycle.

It is therefore an object of the present invention to provide brine metering means for regulating or controlling the quantity of brine drawn during a regeneration cycle of water softening equipment.

An object of the invention is to provide a novel device for controlling the level of liquid in a tank between two predetermined levels.

An object of this invention is the provision of a device according to the foregoing objects which provides adjustable means for controlling the quantity of brine required for the regeneration cycles of water softening equipment of various capacities.

It is an object of the invention to provide brine metering means according to the foregoing objects which provide a high degree of versatility through the utilization of calibrating means which render it useful with brine tanks of all capacities.

An object of this invention is to provide apparatus for controlling the quantity of water introduced into a brine storage tank or compartment in water softening equipment.

An object of this invention is the provision of novel brine metering valve means for providing a preselected amount of brine for the regeneration cycle of water softening equipment.

Another object of the invention is the provision of novel brine metering valve means according to the foregoing object which provides positive control of the amount of brine utilized, while minimizing the consumption of salt.

Another object of the invention is the provision of novel brine metering valve means according to the foregoing objects which provides for fine adjustment of the quantity of brine supplied during the regeneration cycle.

Other objects, features and advantages of the present invention will become apparent to those versed in the art from a consideration of the following description, the appended claims and the accompanying drawings, wherein:

FIGURE 1 is a elevational view, partially in section, showing water softening equipment wherein the brine metering valve of the invention is utilized;

FIGURE 2 is an enlarged view, partially in section, of the structure encircled at 2 in FIGURE 1, showing an elbow connection and metering pin;

FIGURE 3 is a view similar to the view of FIGURE 2, showing the metering pin of FIGURE 2 in a different position of operation;

FIGURE 4 is an enlarged sectional view, taken at line 4—4 of FIGURE 2;

FIGURE 5 is an enlarged sectional view of the structure encircled at 5 in FIGURE 1;

FIGURE 12 is a sectional view taken at line 12—12 of FIGURE 7;

FIGURE 13 is a view taken at line 13—13 of FIGURE 6;

FIGURE 14 is an enlarged partial sectional view, showing the lower portion of the brine metering valve of FIGURES 6, 7 and 8; and FIGURE 15 is an elevational view, similar to the view of FIGURE 1, wherein the flow pattern during the regeneration cycle is indicated.

Figure 6:
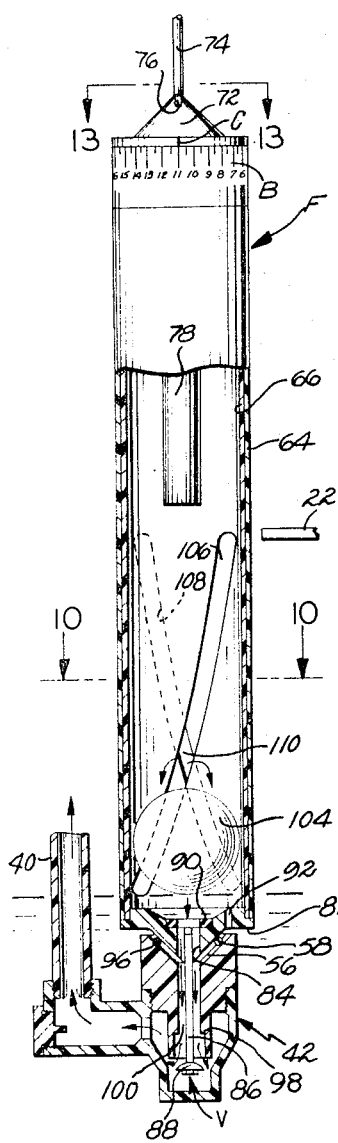
FIGURE 6 is an enlarged view, partially in section, of a brine metering valve according to the present invention, which forms part of the equipment of FIGURE 1.

Referring to the drawings, and particularly to FIGURE 1, there is shown water softening equipment wherein brine metering valve means according to the present invention is utilized. The equipment generally comprises a softener tank S, a brine tank B, a master valve or mechanism and timing system M, a float well W within the brine tank, and a brine metering float valve F within the well.

As shown in FIGURE 1, the softener tank S contains a bottom layer of gravel 10, an intermediate layer of filtering sand 12, and an exchanger bed 14 which preferably comprises a resinous material or a natural material such as zeolite or mineral. The top of the tank is provided with a filling opening in which a fluid-tight cap 16 is threaded. The brine tank B has an open top which may be provided with a removable cover (not shown). A quantity of salt 18 is supported on a perforated brine grid 20 in the brine tank. The fluid level in the brine tank is indicated at 22. The salt grid defines a brine compartment 24 in the lower portion of the brine tank. Communication between the brine compartment and the interior of the float well W is provided by slots 26 in the well (FIGURES 1 and 15).

A port valve V in the well W cooperates in the admission of water to the brine tank and in the withdrawal of brine from the tank, as hereinafter described.

The master control mechanism or valve M is connected with a header screen 28 in the upper portion of the softener tank by a fluid coupling 29. The valve or mechanism M is interconnected with the float valve F through a pipe 30, wherein is mounted a check valve, a T-connection 34, a pipe section 36, an elbow connection 38, a vertical fluid coupling 40, and a valve body 42 positioned beneath the float valve F. Extending from the T-connection 34 is a pipe 44 which at its opposite end is connected to a T-connection 46 to which is connected a bent perforated pipe 48 which extends into the gravel 10 at the bottom of the softener tank S. The outlet 50 of T-connection 46 constitutes a softened water outlet 50.

As shown in FIGURES 2, 3 and 4, a metering pin 52 is positioned within the elbow connection 38, and has a flange portion 54 which seats against a shoulder 56 provided by the end of fluid coupling 40 which is threaded into the elbow connection. A notch or orifice 58 is defined in flange portion 54.

As indicated in FIGURE 5, the T-connection 34 has defined therein a venturi 60 adjacent to an injector passage 62.

FIGURES 6 through 14 illustrates a brine metering float valve of the invention. The float valve F includes an outer adjustable split sleeve or metering sleeve 64 which is rotatable relative to an inner metering cage 66. A calibration scale 68 is provided on the upper end portion of the metering sleeve and cooperates with a reference mark or line 70 defined on an adjacent rim portion of the metering cage 66. Secured, as by cementing, at the upper end of the metering cage is an end member 72, shown in FIGURE 13, which has a conical portion having an axial opening in which is secured a guide rod 74. Openings or passages 76 are defined in the end member about the rod, as shown. A tube 78 is secured by threaded engagement in end member 72, extends axially within the metering cage, as shown, and communicates with the end member openings 76. The guide rod 74 extends through and slidably engages a guide member 80 secured to the pipe or fluid coupling 40.

Secured at the lower end of the metering cage 66 is a lower end member 82 which has a conical portion wherein an axial opening 84 is defined. As best shown in FIGURE 12, opening 84 has radially extending portions defined by rib portions of the end member 82. Secured, as by cementing, to these rib portions of the end member is a rod portion 86 of a valve member 88. A resilient annular sealing element 90 is seated in an appropriate recess about the inner end of the passage 84. A bleed hole 92 is provided in the end member 82, as shown.

The valve body 42 has a conical recess 94 wherein a resilient sealing ring 96 is mounted. The conical portion of float end member 82 cooperates with this sealing ring to provide fluid sealing when the float F rests upon the the sealing ring 96, thereby effecting valve closure, as indicated in FIGURE 6.

Figure 7:
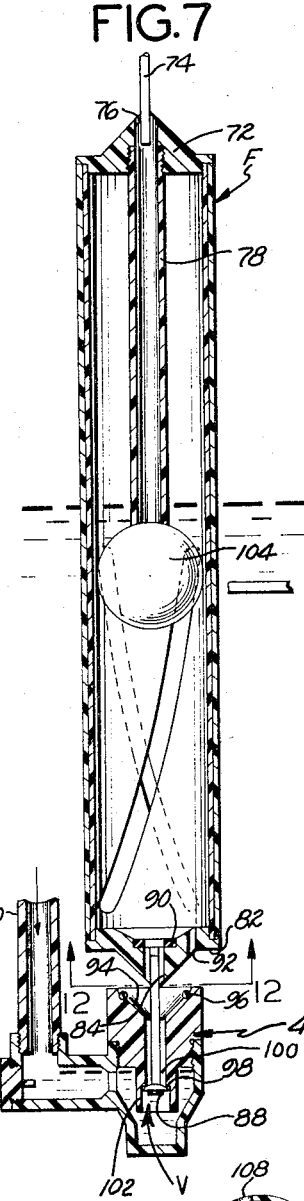
FIGURE 7 is an enlarged sectional view, similar to the view of FIGURE 6, showing the brine metering valve in a different position of operation.
Figure 8:
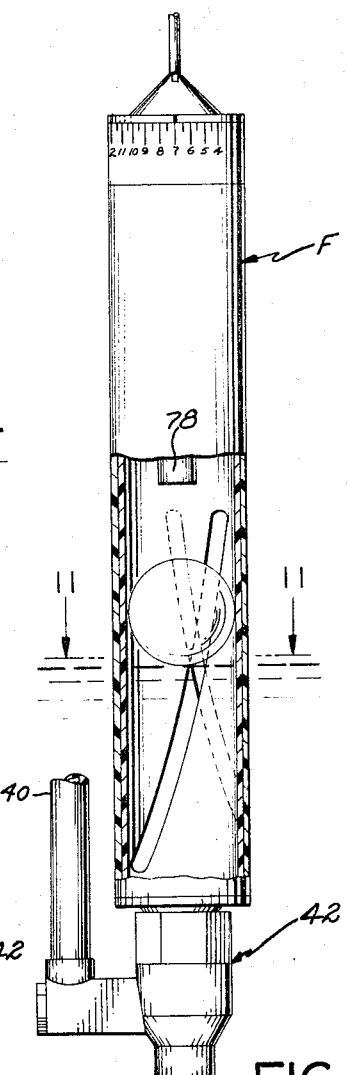
FIGURE 8 is an enlarged view, somewhat similar to the views of FIGURES 6 and 7.
Figure 9:
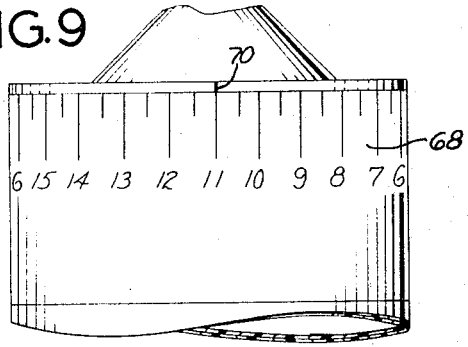
FIGURE 9 is an enlarged fragmentary view, showing details of the calibration scale of the brine metering float valve of FIGURES 6, 7 and 8.
Figures 10, 11:
FIGURE 10 is a sectional view taken at line 10—10 of FIGURE 6.
FIGURE 11 is a sectional view, taken at line 11—11 of FIGURE 8.

The port valve V comprises the valve member 88 and a shoulder 98, which cooperate to close a port 100 and to provide fluid sealing when the float is in the upward position indicated in FIGURE 7. Valve member 88 is guided by an extending tubular portion 102 of the valve body. The valve body 42 includes, in addition to its body portion, a lower fluid conduit portion threadedly secured to the body portion, as shown.

Freely movable within the float F is an air shut-off ball 104, preferably fabricated of low specific gravity polyethylene, which is engageable with the tube 78 in the manner indicated in FIGURE 7 to provide sealing.

A feature of the invention is the provision of an inclined, curved or spiral slot or opening 106 in the metering cage 66 of the float valve F, and the provision of a similar, but oppositely inclined or curved slot 108 in the metering sleeve 64. These slots or openings cooperate to define a weir port 110. As hereinbefore described, the metering sleeve 64 is rotatable as by manual manipulation relative to the metering cage 66. The curved or spiral slots 106 and 108 being oppositely inclined, it will be understood from the geometrical relationships of the parts, that the weir port 110 is adjustable in axial position on the float F by such relative rotation. Therefore, the elevation or vertical position of the weir port 110 in the brine tank B may be set or predetermined by selective rotation of the metering sleeve 64 relative to the metering cage of the float valve F. This adjustment feature is hereinafter discussed further.

In the operation of the water softening equipment of FIGURE 1, the service or water softening cycle begins with the filling or refilling of the brine tank B, under the control of the master control mechanism or valve M. Water is introduced from a source of supply through the T-connection 34, elbow connection 38 and the refill fluid coupling 40. Flow is restricted by means of the orifice 58 in the metering pin 52 in the elbow connection. As indicated in FIGURE 2, downward flow of water seats the metering pin against the shoulder 56, so that flow can occur only through the orifice. The incoming water passes downward through coupling 40, through valve body 42, and thence into the interior of float well W, from where it passes to the interior of the brine tank B through the elongated openings 26 in the float well (FIGURES 1 and 15).

The bleed hole 92 in lower end member 82 of the float F prevents premature flotation of float F, thereby preventing premature seating of valve member 88 at the instant of transition from the last portion of the regeneration or rinse cycle to the beginning of the refill portion of the service cycle. Such premature flotation would otherwise be caused when the weir port 110 is in its uppermost position, because an evacuated chamber would exist within float F between the weir level (the brine level in the brine tank) and the level of the sealing element 90, this level being the lowest level to which brine is withdrawn from the float. This evacuated chamber would effect an upward buoying action on float F and effect the closure of valve member 88 at the start of the refill cycle.

The bleed hole 92 prevents this buoying action by providing limited communication between the interior of the float F and the brine well, thus permitting float F to refill slowly during the rinse portion of the regeneration cycle to the level of the brine in the brine tank. During the rinse portion of the regeneration cycle, ball 104 is held in a sealing position against sealing element 90 by the pressure drop in coupling 40, created by the venturi action at the T-connection 34, and is unaffected by the bleed hole refill of float F until the start of the refill cycle.

For a purpose which is hereinafter described, after refill the maximum brine level in brine tank B is maintained at the predetermined level indicated at 22 in FIGURE 1. This level 22 is such that the water extends into the salt 18 above the salt grid 20. Upon reaching this predetermined level, the water reaches and rises above the lower end opening of the tube 78 in the float F. Air is thereby trapped in the upper portion of the float about the tube 78. The exertion of the water pressure against the trapped air produces pressure in the trapped air, which supports float F in the position shown in FIGURE 7, wherein the port valve member 88 is seated against the shoulder 98 to effect closure of port valve V and prevent admission of additional water. The port valve V is maintained in this closed position by the exertion of water pressure on valve member 88 through the fluid coupling 40 and the valve body 42.

In the foregoing manner, the water level 22 is maintained that it extends into the salt 18 above the salt grid 20 (FIGURE 1).

Brine is formed by the dissolving of salt 18 above salt grid 20, which is perforated to permit the water to contact the salt. Saturated brine is thus formed in the brine compartment 24, by the well-known process wherein the heavier brine falls through the salt grid, displaces water, rises, and mixes.

The service or softening cycle involves the conventional flow pattern shown in FIGURE 1, wherein incoming water from a source of supply passes through the master control mechanism M, through the header screen 28, passes downwardly through the softener tank, wherein it is softened by ion exchange in a conventional manner, and then passes through the perforated pipe 48 and outwardly through the softened water outlet 50.

The regenerated or brining cycle is initiated in conventional manner by the master control valve mechanism M, which, as indicated in FIGURE 15, effects a downward flow of incoming raw water through pipe 30, T-connection 34 and pipe section 44, through the perforated pipe 48 into the softener tank wherein it passes upwardly, thence outwardly to the header screen and the master control mechanism M to drain.

The downward flow of the incoming water through the T-connection 34 effects a venturi action at the venturi passage 60 (FIGURE 5), thereby effecting drawing or injection of brine through the injector passage 62 into the pipe section 44. As indicated in FIGURE 15, brine flows upwardly through refill coupling 40 and through the elbow connection 38 to T-connection 34. Flow in this direction through elbow connection 38 unseats metering pin 54 from the shoulder 56, as indicated in FIGURE 3, thereby permitting relatively free flow through the elbow connection. Metering pin 54 thus serves as a check valve to restrict downward flow and to permit free upward flow.

The venturi or injector action at T-connection 34 effects a pressure drop in coupling 40 and in valve body 42 thereby causing the float F to drop to the position shown in FIGURE 6, wherein the conical portion of its end member 82 seats against sealing ring 96, and wherein the member 88 of port valve V is unseated.

Upon the unseating of valve member 88 to effect opening of the port valve V, brine flows into the float F through the weir port 110, downwardly through the float, through axial opening 84, thence through the port 100 and upwardly through refill coupling 40 in the elbow connection 38. It will be appreciated that the geometry of the venturi 60 and injector passage 62 are designed to provide the desired predetermined concentration of brine for passage upwardly through the softener tank during the bringing or regeneration cycle.

After the predetermined quantity of brine, governed as hereinafter described, has passed through the softener tank, the rinse portion of the regeneration cycle occurs. Continued flow of water through the venturi 60 in T-connection 34 effects flow of raw incoming water upward to the softener tank to flush the brine from the tank. The master control mechanism M governs the time duration of the rinse portion of the cycle. Following this, the control mechanism M effects initiation of the service cycle hereinbefore described.

An important feature of the present invention is the arrangement whereby the float valve F governs or predetermines the quantity of brine to be drawn from the brine compartment during the regeneration cycle. This quantity is predetermined or controlled by the distance between the adjustable weir 110 and the brine level 22 (FIGURE 1). Because brine must pass through the weir port 110 to be drawn from the brine compartment, the level of the weir determines the lowest level at which brine may be drawn from brine compartment 24.

The volume or quantity of water between the brine level 22 and the weir port opening 110 constitutes the quantity of brine drawn on the regeneration cycle. As hereinbefore described, the level in the brine tank is maintained at the level 22. The brine being saturated, the total quantity or weight of salt utilized on each regeneration cycle is predetermined.

The features of the float F constitute features of the present invention. Among these is the adjustable weir arrangement, which is provided by the coaction of the rotatable sleeve 64 and the metering cage 66 to predetermine the quantity of brine drawn on a regeneration cycle. The height or vertical position of the weir port 110 is adjusted or selected by relative rotation between the sleeve 64 and the metering cage 66. As hereinbefore described, the inclined or spiral-shaped slots, being oppositely directed or inclined, effect variation in the axial position of the weir on the float F, as will be observed from the geometric relations of these parts.

At the time of installation or adjustment of the equipment, the quantity of brine to be utilized during regeneration cycles may be selected by means of the calibration scale 68 on the float F. The calibration may be in terms of volume or quantity of saturated brine. Preferably, calibration is in terms of pounds of salt utilized during each regeneration cycle, because this is better understood by laymen and by those skilled in the art. Calibration in terms of pounds of salt is feasible, in the utilization of the present invention, because the brine is saturated, and the weight of salt contained in a given volume is fixed. For example, an 18 inch diameter brine tank might typically have a calibration scale range which corresponds to 18 pounds of salt, and the lowest numeral on this scale might be 4, this number 4 representing the number of pounds of salt dissolved in a saturated brine solution between the uppermost weir opening level and the predetermined liquid level in the brine tank.

From the foregoing description, it will be understood that the brine metering valve of the invention provides fine adjustability of the quantity of brine utilized or drawn during the regeneration cycle of water softening equipment. It will be understood that such adjustability is provided by convenient and simple movement of parts, and that the adjustment may be done conveniently by reference to a calibration scale by merely dialing the quantity or weight marked on a scale on the float valve.

It will be readily understood that by multiplying the numerals on the calibration scale by appropriate factors, the device may be utilized with correspondingly larger diameter brine tanks. For example, the scale numbers might be multiplied by a factor of 2 when the device is utilized with a 24 inch nominal diameter brine tank, instead of the aforementioned 18 inch tank. Correspondingly, by utilizing the appropriate factors in conjunction with the calibration scale, correspondingly larger tanks might be utilized with the device.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. In a water softening system having a soft water tank, a brine tank, a hard water inlet, a soft water outlet, a drain, and means including a conduit connected to said brine tank for selectively effecting water flow from said inlet through said conduit to said brine tank during a brine tank filling cycle of said system, water flow from said inlet through said water tank to said outlet during normal water softening operation of said system, and brine flow from said brine tank through said conduit and water tank to said drain during a regenerating cycle of said system, mechanism for regulating water flow into said brine tank during said brine tank filling cycle comprising:

a valve in said brine tank having a passage communicating at one end with said conduit and opening at its other end to the interior of said brine tank, whereby water flow occurs through said passage into said brine tank during said filling cycle, a valve seat about and facing in the upstream direction of water flow through said passage, and a valve member movable between an opened position relative to said valve seat wherein said valve is conditioned to permit water flow through said passage into said brine tank and a closed position of engagement with said valve seat wherein said valve is conditioned to block water flow through said passage to said brine tank, a valve float in said brine tank comprising a hollow vessel defining a chamber having upper and lower ends, said vessel being disposed in a lower limiting position when said brine tank is empty, means communicating said passageway with said chamber and further means communicating said chamber to the interior of said brine tank in such manner that during said filling cycle water initially enters said chamber from said passageway until the water rises in said chamber to a given level spaced from said upper chamber end, wherein said means communicating said chamber and brine tank interior comprises a vent having an upper end opening to the interior of said brine tank above said float vessel and a lower end opening to said chamber below said upper end of said chamber, said vent and chamber being so constructed and arranged as to trap air between said lower vent end and the upper end of said chamber when the water in the chamber rises to the level of the lower vent end, said port means communicating said chamber to the interior of said brine tank below said lower vent end wherein said trapped air produces a buoyant force on said float which elevates said float from said lower limiting position to an upper limiting position in response to continued rising of the water level in said brine tank to a normal level, and means connecting said float and valve member for effecting movement of said valve member to its closed position upon movement of said float vessel to its upper limiting position and movement of said valve member to its open position upon movement of said float vesesl to its lower limiting position.

2. Flow regulating mechanism according to claim 1 wherein:

said other end of said valve passage is vertical, said valve seat is located at the lower extremity of said vertical passage end and faces downwardly, and said valve member extends upwardly through said vertical passage end for connection to said float vessel, said float vessel has a lower passage communicating with said float chamber and opening downwardly toward said vertical valve passage end, said brine tank is adapted to contain salt to be dissolved in the water entering said brine tank for producing a brine in said brine tank, said valve has an upper valve seat about the upper extremity of said vertical valve passage end, said float vessel has a valve face about said lower float passage for engaging said upper valve seat when said float vessel occupies said lower limiting position, said float vesesl rises to separate said upper valve seat and said float valve face during said filling cycle to admit water to said brine tank, and said float vessel lowers to engage said float valve face with said upper valve seat during said regenerating cycle to block brine flow between the latter valve face and valve seat, and said float port means comprise a side port in the wall of said float a distance below said normal water level through which brine flows from said brine tank to said chamber and then from said chamber to said lower lower float pasage and valve passage to said conduit during said regenerating cycle, whereby brine flow occurs from said brine tank until the brine level in said tank drops below said side port.

3. Flow regulating mechanism according to claim 2 wherein:

said float port means further comprises a bleed port in the lower end of said float vesesl through which water bleeds into said chamber during said filling cycle to prevent movement of said valve member to its closed position by rising of said float vessel during the initial portion of said filling cycle, said float vesesl has a valve seat about the upper end of said lower float pasage and facing into said chamber, and a float valve within said float chamber engageable with said float valve seat to prevent continued brine drain from said brine tank through said lower float passage after the brine level in said brine tank is dropped below the level of said float side port.

4. Flow regulating mechanism according to claim 3 including:

means for adjusting the position of said float side port relative to said float vessel in the vertical direction of said vessel.

References Cited

UNITED STATES PATENTS

| | | | |
|---|---|---|---|
| 2,716,422 | 8/1955 | Whitlock | 210—190 X |
| 2,985,423 | 5/1961 | Tischler et al. | 137—398 X |
| 3,089,508 | 5/1963 | Schulze et al. | |
| 3,185,302 | 5/1965 | Kryzer | 210—191 X |
| 3,233,732 | 2/1966 | Lung et al. | 210—191 X |

REUBEN FRIEDMAN, *Primary Examiner.*

C. DITLOW, *Assistant Examiner.*